(12) United States Patent
Rong

(10) Patent No.: US 11,277,801 B2
(45) Date of Patent: Mar. 15, 2022

(54) SYSTEM AND METHOD FOR UPLINK POWER CONTROL IN A COMMUNICATIONS SYSTEM WITH MULTI-ACCESS POINT COORDINATION

(71) Applicant: Huawei Technologies Co., Ltd., Shenzhen (CN)

(72) Inventor: Zhigang Rong, San Diego, CA (US)

(73) Assignee: Huawei Technologies Co., Ltd., Shenzhen (CN)

(\*) Notice: Subject to any disclaimer, the term of this patent is extended or adjusted under 35 U.S.C. 154(b) by 72 days.

(21) Appl. No.: 16/917,670

(22) Filed: Jun. 30, 2020

(65) Prior Publication Data

US 2020/0336989 A1 Oct. 22, 2020

Related U.S. Application Data

(63) Continuation of application No. PCT/CN2019/084963, filed on Apr. 29, 2019.

(Continued)

(51) Int. Cl.
*H04W 24/10* (2009.01)
*H04W 52/02* (2009.01)
(Continued)

(52) U.S. Cl.
CPC ......... *H04W 52/146* (2013.01); *H04W 24/10* (2013.01); *H04W 52/0245* (2013.01); *H04W 52/16* (2013.01); *H04W 52/242* (2013.01); *H04W 52/245* (2013.01); *H04W 52/246* (2013.01); *H04W 52/343* (2013.01); *H04W 52/386* (2013.01); *H04W 52/40* (2013.01); *H04W 52/54* (2013.01); *H04W 72/042* (2013.01); *H04W 72/0446* (2013.01); *H04W 72/1289* (2013.01); *H04W 76/11* (2018.02); *H04W 76/15* (2018.02); *H04W 84/12* (2013.01); *H04W 88/02* (2013.01); *H04W 88/08* (2013.01);
(Continued)

(58) Field of Classification Search
CPC ......... H04B 7/02–0495; H04B 17/0082–3913; H04L 5/003–0098; H04W 8/22–245; H04W 24/02–10; H04W 28/02–26; H04W 36/0005–385; H04W 48/02–20; H04W 52/02–60; H04W 60/005–06; H04W 72/005–14; H04W 76/10–50; H04W 84/02–16; H04W 88/005–12; H04W 92/02; H04W 92/04; H04W 92/10; H04W 92/12; H04W 92/16; H04W 92/20
See application file for complete search history.

(56) References Cited

U.S. PATENT DOCUMENTS

2012/0004007 A1\* 1/2012 Zhou .................... H04W 52/06
2016/0100370 A1\* 4/2016 Rong ................... H04W 52/146
2016/0119881 A1\* 4/2016 Merlin .................. H04W 52/10

\* cited by examiner

*Primary Examiner* — Timothy J Weidner
(74) *Attorney, Agent, or Firm* — Slater Matsil, LLP

(57) ABSTRACT

A computer-implemented method for operating a station includes receiving a first frame indicating a resource location for transmitting a packet, a first target power level at a first access point (AP), a second target power level at a second AP, and a first transmit power level, determining a second transmit power level in accordance with the first target power level, the second target power level, and the first transmit power level, and transmitting the packet in the resource location indicated by the first frame, wherein the packet is transmitted in accordance with the second transmit power level.

20 Claims, 8 Drawing Sheets

Related U.S. Application Data

(60) Provisional application No. 62/768,229, filed on Nov. 16, 2018, provisional application No. 62/749,395, filed on Oct. 23, 2018.

(51) Int. Cl.
*H04W 52/14* (2009.01)
*H04W 52/16* (2009.01)
*H04W 52/24* (2009.01)
*H04W 52/34* (2009.01)
*H04W 52/38* (2009.01)
*H04W 52/40* (2009.01)
*H04W 52/54* (2009.01)
*H04W 72/04* (2009.01)
*H04W 72/12* (2009.01)
*H04W 76/11* (2018.01)
*H04W 76/15* (2018.01)
*H04W 84/12* (2009.01)
*H04W 88/02* (2009.01)
*H04W 88/08* (2009.01)
*H04W 88/12* (2009.01)
*H04W 92/02* (2009.01)
*H04W 92/10* (2009.01)
*H04W 92/12* (2009.01)
*H04W 92/20* (2009.01)

(52) U.S. Cl.
CPC ............ *H04W 88/12* (2013.01); *H04W 92/02* (2013.01); *H04W 92/10* (2013.01); *H04W 92/12* (2013.01); *H04W 92/20* (2013.01)

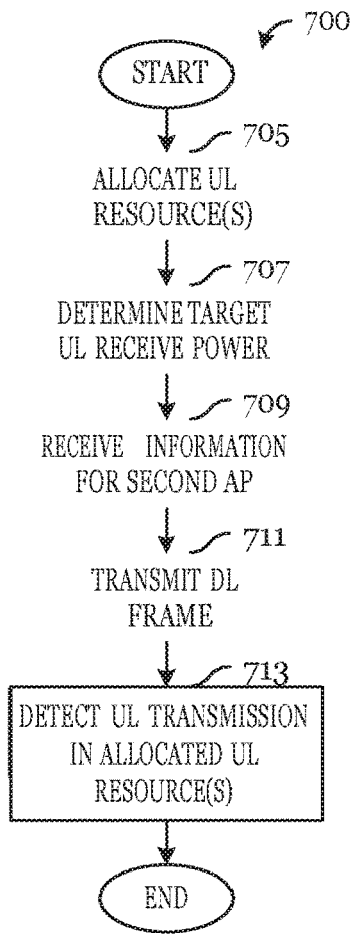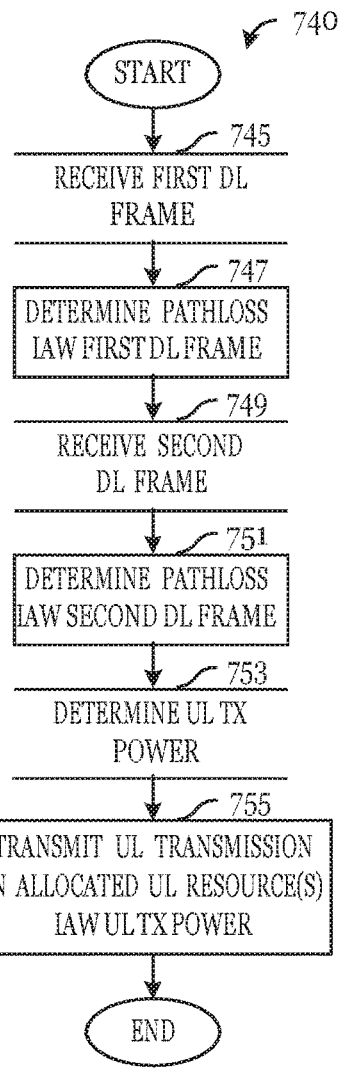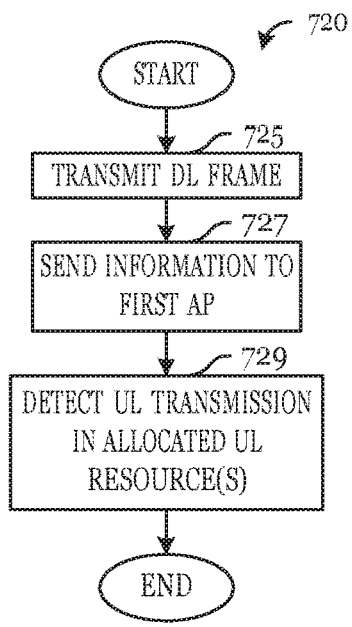
Fig. 7A
Fig. 7C
Fig. 7B

SYSTEM AND METHOD FOR UPLINK POWER CONTROL IN A COMMUNICATIONS SYSTEM WITH MULTI-ACCESS POINT COORDINATION

This application is a continuation of International Application No. CN/2019/084963, filed on Apr. 29, 2019, which claims the benefit of U.S. Provisional Application No. 62/749,395, filed on Oct. 23, 2018, entitled "System and Method for Uplink Power Control in a Communications System with Multi-Access Point Coordination," and U.S. Provisional Application No. 62/768,229, filed on Nov. 16, 2018, entitled "System and Method for Uplink Power Control in a Communications System with Multi-Access Point Coordination." The aforementioned applications are hereby incorporated herein by reference in their entireties.

TECHNICAL FIELD

The present disclosure relates generally to a system and method for digital communications, and, in particular embodiments, to a system and method for uplink power control in a communications system with multi-access point coordination.

BACKGROUND

Current generation wireless communications systems provide high data rates for mobile communications devices to enable a rich multi-media environment for users of the mobile communications devices. However, the complexity of applications available to the users continues to increase, along with the need for increased throughput and lower latency. As an example, newly emerging technologies and applications such as high-definition video (such as 4 k, 8 k, and beyond video) over wireless local area network (WLAN), augmented reality (AR), virtual reality (VR), and so on, place significantly higher performance requirements (e.g., throughput and latency) on wireless communications systems than existing technologies and applications.

The IEEE 802.11 Working Group (WG) has formed a Study Group (SG) referred to as Extreme High Throughput (EHT) to develop new generations of physical (PHY) and media access control (MAC) layers with goals of increased peak throughput, improved efficiency, and low latency, to such technologies and applications. The EHT SG is targeting operation in bands between 1 GHz and 7.125 GHz.

SUMMARY OF THE INVENTION

According to a first aspect, a computer-implemented method for operating a station is provided. The computer-implemented method for operating a station, the computer-implemented method includes receiving, by the station, a first frame indicating a resource location for transmitting a packet, a first target power level at a first access point (AP), a second target power level at a second AP, and a first transmit power level, determining, by the station, a second transmit power level in accordance with the first target power level, the second target power level, and the first transmit power level, and transmitting, by the station, the packet in the resource location indicated by the first frame, wherein the packet is transmitted in accordance with the second transmit power level.

In a first implementation form of the computer-implemented method according to the first aspect as such, wherein a first indicator of the first target power level indicates a first target uplink receive power of the packet at the first AP, and wherein a second indicator of the second target power level indicates a second target uplink receive power of the packet at the second AP.

In a second implementation form of the computer-implemented method according to the first aspect as such or any preceding implementation form of the first aspect, wherein the first frame further indicates an identifier of the second AP.

In a third implementation form of the computer-implemented method according to the first aspect as such or any preceding implementation form of the first aspect, wherein the first frame further indicates that a second frame transmitted by the second AP is preceded by the first frame in a time domain.

In a fourth implementation form of the computer-implemented method according to the first aspect as such or any preceding implementation form of the first aspect, wherein the first frame further indicates a third transmit power level.

In a fifth implementation form of the computer-implemented method according to the first aspect as such or any preceding implementation form of the first aspect, further includes receiving, by the station, a second frame from the second AP after receiving the first frame.

In a sixth implementation form of the computer-implemented method according to the first aspect as such or any preceding implementation form of the first aspect, further includes receiving, by the station, a second frame from a second AP prior to receiving the first frame.

In a seventh implementation form of the computer-implemented method according to the first aspect as such or any preceding implementation form of the first aspect, wherein determining the second transmit power level includes measuring, by the station, a first received power level of the first frame, determining, by the station, a first pathloss in accordance with the first received power level, measuring, by the station, a second received power level of the second frame, determining, by the station, a second pathloss in accordance with the second received power level, and determining, by the station, the second transmit power level in accordance with the first pathloss and the second pathloss.

In an eighth implementation form of the computer-implemented method according to the first aspect as such or any preceding implementation form of the first aspect, wherein the first pathloss includes a first pathloss of a first channel between the station and the first AP, and wherein the second pathloss includes a second pathloss of a second channel between the station and the second AP.

In a ninth implementation form of the computer-implemented method according to the first aspect as such or any preceding implementation form of the first aspect, wherein the second transmit power level is determined by applying a mathematical function to the first target power level, the second target power level, the first pathloss, and the second pathloss.

In a tenth implementation form of the computer-implemented method according to the first aspect as such or any preceding implementation form of the first aspect, wherein the mathematical function is expressible as $$P_{UL\_TX} = \min(UL\_Target\_RSSI\_AP1 + PL\_AP1, UL\_Target\_RSSI\_AP2 + PL\_AP2),$$

where $P_{UL\_TX}$ is the second transmit power level, UL_Target_RSSI_AP1 is the first target power level, UL_Target_RSSI_AP2 is the second target power level, PL_AP1 is the first pathloss, PL_AP2 is the second pathloss, and min( ) is a minimum function which returns the minimum value of its input elements.

In an eleventh implementation form of the computer-implemented method according to the first aspect as such or any preceding implementation form of the first aspect, wherein the mathematical function is expressible as $$P_{UL\_TX} = (UL\_Target\_RSSI\_AP1 + PL\_AP1 + UL\_Target\_RSSI\_AP2 + PL\_AP2)/2,$$

where $P_{UL\_TX}$ is the second transmit power level, UL_Target_RSSI_AP1 is the first target power level, UL_Target_RSSI_AP2 is the second target power level, PL_AP1 is the first pathloss, and PL_AP2 is the second pathloss.

In a twelfth implementation form of the computer-implemented method according to the first aspect as such or any preceding implementation form of the first aspect, wherein the mathematical function is expressible as $$P_{UL\_TX} = \max(UL\_Target\_RSSI\_AP1 + PL\_AP1, UL\_Target\_RSSI\_AP2 + PL\_AP2) - \text{Correction\_factor},$$

where $P_{UL\_TX}$ is the second transmit power level, UL_Target_RSSI_AP1 is the first target power level, UL_Target_RSSI_AP2 is the second target power level, PL_AP1 is the first pathloss, PL_AP2 is the second pathloss, Correction_factor is a correction value to compensate for a combining gain of the packet at APs receiving the packet, and max( ) is a maximum function which returns the maximum value of its input elements.

According to a second aspect, a computer-implemented method for operating an access point is provided, the computer-implemented method includes transmitting, by the first AP, a first frame indicating a resource location for transmitting a packet, a first target power level at the first AP, a second target power level at a second AP, and a first transmit power level, and receiving, by the first AP, the packet in the resource location, wherein the packet is received at a receive power level determined in accordance with the first target power level, the second target power level, and the first transmit power level.

In a first implementation form of the computer-implemented method according to the second aspect as such, wherein a first indicator of the first target power level indicates a first target uplink receive power of the packet at the first AP, and wherein a second indicator of the second target power level indicates a second target uplink receive power of the packet at the second AP.

In a second implementation form of the computer-implemented method according to the second aspect as such or any preceding implementation form of the second aspect, wherein the first frame further indicates an identifier of the second AP.

In a third implementation form of the computer-implemented method according to the second aspect as such or any preceding implementation form of the second aspect, wherein the first frame further indicates that a second frame from the second AP is preceded by the first frame in a time domain.

In a fourth implementation form of the computer-implemented method according to the second aspect as such or any preceding implementation form of the second aspect, wherein the first frame further indicates a third transmit power level.

In a fifth implementation form of the computer-implemented method according to the second aspect as such or any preceding implementation form of the second aspect, further includes receiving, by the first AP, the second target power level from the second AP.

In a sixth implementation form of the computer-implemented method according to the second aspect as such or any preceding implementation form of the second aspect, further includes receiving, by the first AP, the second target power level from a central controller.

According to a third aspect, a station is provided, the station includes a non-transitory memory storage comprising instructions, and one or more processors in communication with the memory storage. The one or more processors execute the instructions to receive a first frame indicating a resource location for transmitting a packet, a first target power level at a first AP, a second target power level at a second AP, and a first transmit power level, determine a second transmit power level in accordance with the first target power level, the second target power level, and the first transmit power level, and transmit the packet in the resource location indicated by the first frame, wherein the packet is transmitted in accordance with the second transmit power level.

In a first implementation form of the station according to the third aspect as such, wherein a first indicator of the first target power level indicates a first target uplink receive power of the packet at the first AP, and wherein a second indicator of the second target power level indicates a second target uplink receive power of the packet at the second AP.

In a second implementation form of the station according to the third aspect as such or any preceding implementation form of the third aspect, wherein the first frame further indicates an identifier of the second AP.

In a third implementation form of the station according to the third aspect as such or any preceding implementation form of the third aspect, wherein the first frame further indicates that a second frame transmitted by the second AP is preceded by the first frame in a time domain.

In a fourth implementation form of the station according to the third aspect as such or any preceding implementation form of the third aspect, wherein the first frame further indicates a third transmit power level.

In a fifth implementation form of the station according to the third aspect as such or any preceding implementation form of the third aspect, wherein the one or more processors further execute the instructions to receive a second frame from the second AP after receiving the first frame.

In a sixth implementation form of the station according to the third aspect as such or any preceding implementation form of the third aspect, wherein the one or more processors further execute the instructions to receive a second frame from the second AP prior to receiving the first frame.

In a seventh implementation form of the station according to the third aspect as such or any preceding implementation form of the third aspect, wherein the one or more processors further execute the instructions to measure a first received power level of the first frame, determine a first pathloss in accordance with the first received power level, measure a second received power level of the second frame, determine a second pathloss in accordance with the second received power level, and determine the second transmit power level in accordance with the first pathloss and the second pathloss.

According to a fourth aspect, a first AP is provided, the first AP comprising: a non-transitory memory storage comprising instructions, and one or more processors in communication with the memory storage. The one or more processors execute the instructions to transmit a first frame indicating a resource location for transmitting a packet, a first target power level at the first AP, a second target power level at a second AP, and a first transmit power level, and receive the packet in the resource location, wherein the packet is received at a receive power level determined in accordance with the first target power level, the second target power level, and the first transmit power level.

In a first implementation form of the first AP according to the fourth aspect as such, wherein a first indicator of the first target power level indicates a first target uplink receive power of the packet at the first AP, and wherein a second indicator of the second target power level indicates a second target uplink receive power of the packet at the second AP.

In a second implementation form of the first AP according to the fourth aspect as such or any preceding implementation form of the fourth aspect, wherein the first frame further indicates an identifier of the second AP.

In a third implementation form of the first AP according to the fourth aspect as such or any preceding implementation form of the fourth aspect, wherein the first frame further indicates that a second frame from the second AP is preceded by the first frame in a time domain.

In a fourth implementation form of the first AP according to the fourth aspect as such or any preceding implementation form of the fourth aspect, wherein the one or more processors further execute the instructions to receive the second target power level from the second AP.

In a fifth implementation form of the first AP according to the fourth aspect as such or any preceding implementation form of the fourth aspect, wherein the one or more processors further execute the instructions to receive the second target power level from a central controller.

An advantage of a preferred embodiment is that the uplink transmit power control is usable in communications system with multi-access point (multi-AP) coordination to help reduce interference, as well as reduce power consumption at a station. The interference reduction may be realized within an overlapping basic service set (OBSS) that includes the station. The power consumption reduction is compared to a situation when the station is transmitting to a single AP.

Yet another advantage of a preferred embodiment is that the power of the received signal from multiple stations at receivers of the APs is at an appropriate level to enable the use of orthogonal frequency division multiple access (OFDMA) and multi-user multiple input multiple output (MU-MIMO) in the uplink to help improve efficient resource utilization.

BRIEF DESCRIPTION OF THE DRAWINGS

For a more complete understanding of the disclosure, and the advantages thereof, reference is now made to the following descriptions taken in conjunction with the accompanying drawings, in which:

FIG. 7A illustrates flow diagrams of example operations occurring in a first AP as the first AP participates in the second example uplink multi-AP transmission according to example embodiments presented herein;

FIG. 7B illustrates flow diagrams of example operations occurring in a second AP as the second AP participates in the second example uplink multi-AP transmission according to example embodiments presented herein;

FIG. 7C illustrates flow diagrams of example operations occurring in a station as the station participates in the second example uplink multi-AP transmission according to example embodiments presented herein;

DETAILED DESCRIPTION OF ILLUSTRATIVE EMBODIMENTS

The making and using of the disclosed embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
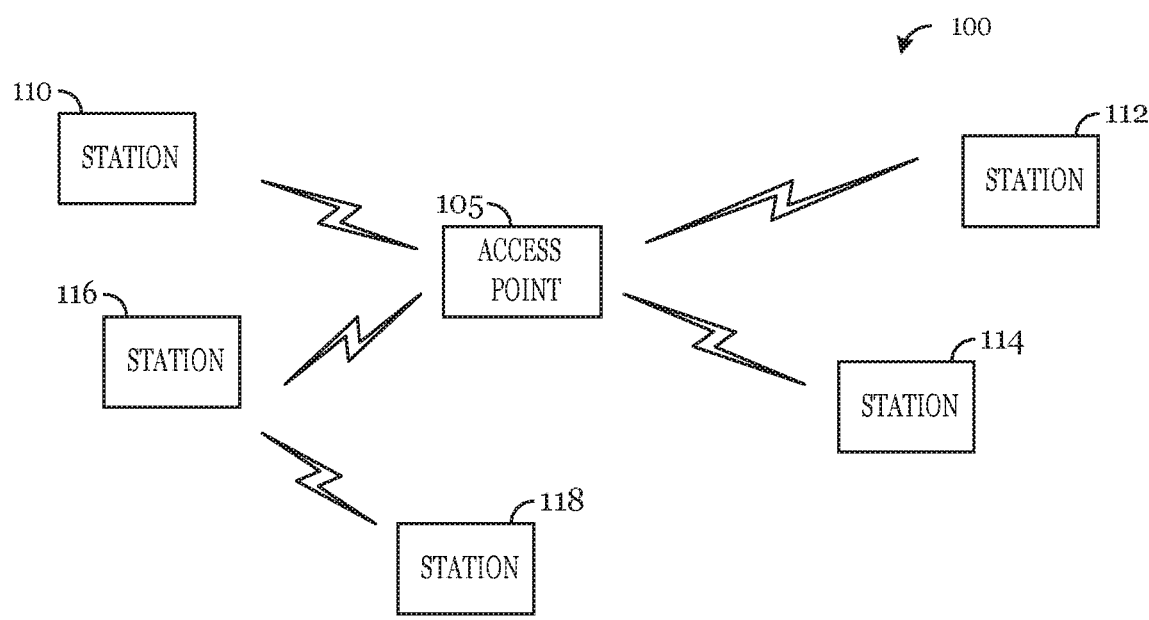
FIG. 1 is an example communications system consisting of an infrastructure BSS.

FIG. 1 shows an example communications system 100 consisting of an infrastructure BSS. Communications system 100 includes an access point (AP) 105 that is serving a plurality of stations (STAs), such as stations 110, 112, 114, 116, and 118. Access point 105 controls certain aspects (such as radio frequency channel, transmission power limit, authentication, security, etc.) of communications with or among its associated stations. Generally speaking, in communications system 100, wireless resources for both uplink (station to access point) and downlink (access point to station) transmissions are accessed by transmitters based on a distributed contention mechanism commonly referred to as carrier sensing multiple access with collision avoidance (CSMA/CA). APs may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while stations may also be commonly referred to as user equipments (UEs), mobile stations, mobiles, terminals, users, subscribers, stations, and the like. APs may provide wireless access in accordance with one or more wireless communication protocols, e.g., the Third Generation Partnership Project (3GPP) long term evolution (LTE), LTE advanced (LTE-A), 5G, 5G LTE, 5G NR, High Speed Packet Access (HSPA), Wi-Fi 802.11a/b/g/n/ac/ad/ax/ay, etc. While it is understood that communications systems may employ multiple APs capable of communicating with a number of stations, only one AP and five stations are illustrated for simplicity.

As discussed previously, a goal of the Extreme High Throughput (EHT) Study Group (SG) formed by the IEEE 802.11 Working Group (WG) is to develop new generations of physical (PHY) and media access control (MAC) layers with increased peak throughput, improved efficiency, and decrease latency, to such technologies and applications.

A technique that may help the EHT SG achieve its goals is multi-access point (multi-AP) coordination. Multi-AP coordination involves multiple APs communicating with one or more stations at the same time. Multi-AP coordination may be used in downlink communications or uplink communications (i.e., downlink communications only, uplink communications only, or both downlink and uplink communications). Multi-AP coordination differs significantly from single AP operation in existing IEEE 802.11 communications systems, where a station communicates with one AP at a time. Multi-AP coordination may help reduce the interference in communications, as well as increase throughput by increasing the number of potential spatial streams that can utilize the communications channels.

As an example, an uplink transmission made by a station may be received by multiple APs when the communications system supports multi-AP coordination. The uplink signals of the uplink transmission, received at multiple APs may be utilized to enhance the quality of the uplink. For example, the uplink signals received at the multiple APs may be combined together to form a signal with better signal plus interference to noise ratio (SINR) before being decoded by a channel decoder, thereby achieving both diversity gain and energy gain. The combined signal with better SINR may be decoded by any of the multiple APs. In other words, a subset of the multiple APs decodes the combined signal. For another example, the uplink signals received by one AP with the best SINR may be decoded by a channel decoder, thereby achieving diversity gain. For yet another example, the multiple APs receiving the uplink signals each individually perform demodulating and decoding to obtain the uplink data packet. If any of the multiple APs successfully decode the uplink data packet, the uplink signal reception is successful, thereby achieving diversity gain.

Figure 2A:
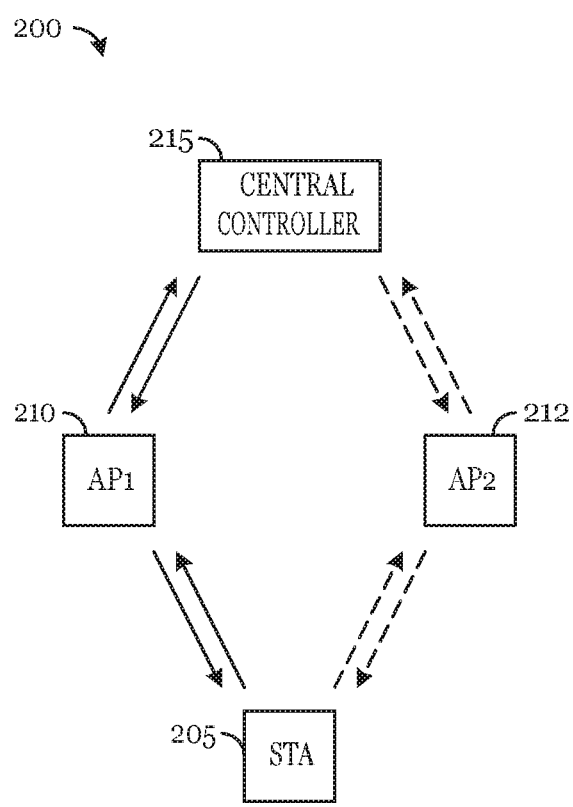
FIG. 2A illustrates a communications system highlighting a first example multi-AP coordination configuration.

FIG. 2A illustrates a communications system 200 highlighting a first example multi-AP coordination configuration. Communications system 200 includes a station 205 that is simultaneously communicating with two APs, AP1 210 and AP2 212. Communications system 200 also includes a central controller 215. As shown in FIG. 2, central controller 215 is coupled to the two APs. However, in practice, central controller 215 may be coupled to additional APs. Central controller 215 may be configured to perform operations such as: combine uplink signals from multiple APs, select the best uplink signals from multiple APs, select the successfully decoded uplink data packet from multiple APs, and so on. Central controller 215 may be coupled to the APs wirelessly, through a wireline connection, or a combination of wireless and wireline connections.

Figure 2B:
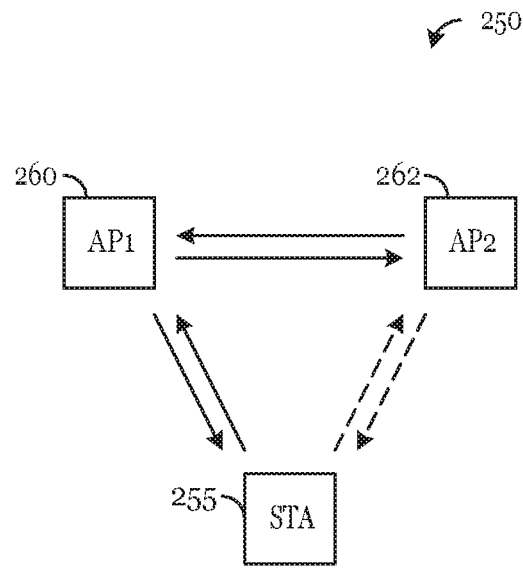
FIG. 2B illustrates a communications system highlighting a second example multi-AP coordination configuration

FIG. 2B illustrates a communications system 250 highlighting a second example multi-AP coordination configuration. Communications system 250 includes a station 255 that is simultaneously communicating with two APs, AP1 260 and AP2 262. As shown in FIG. 2B, the two APs are not coupled to a central controller (as are the two APs shown in FIG. 2A), however, communications system 250 may include one or more central controllers that are coupled to other APs. Without being coupled to a central controller, one or both of the APs perform the operations of the central controller (as related to multi-AP coordination), including: combine uplink signals from multiple APs, select the best uplink signals from multiple APs, select the successfully decoded uplink data packet from multiple APs, and so on. The two APs exchange information, such as uplink signals, decoded uplink data packets, SINRs, and so on, as needed to perform the operations. As an example, AP1 260 may perform the operations utilizing its own measurements and decoding results, as well as information provided by AP2 262. After performing the operations, AP1 260 may share the results with AP2 262. The AP may be coupled together wirelessly, through a wireline connection, or a combination of wireless and wireline connections.

In order to support uplink multi-user transmission, e.g., OFDMA and uplink MU-MIMO, it is required that the power level of the received signal from multiple stations at the receiver of the AP be at an appropriate level to avoid significant interference among the stations. As an example, the power of the received signals from the multiple stations should be at about the same level or within a range of levels. Uplink transmission power control may be utilized to make sure that the power level of the received signals from the multiple stations at the receiver of the AP be at the appropriate level. Existing uplink power control methods only consider a single AP as the uplink receiver. In multi-AP coordination, multiple AP receivers are possible (if not expected). Given the diversity gain or energy gain that may be achieved in uplink multi-AP coordination, systems and methods for uplink power control in a communications system with uplink multi-AP coordination are needed. These systems and methods for uplink power control can lead to reduced power consumption at the stations, as well as reduced interference to the overlapping basic service set (OBSS).

Figure 3:
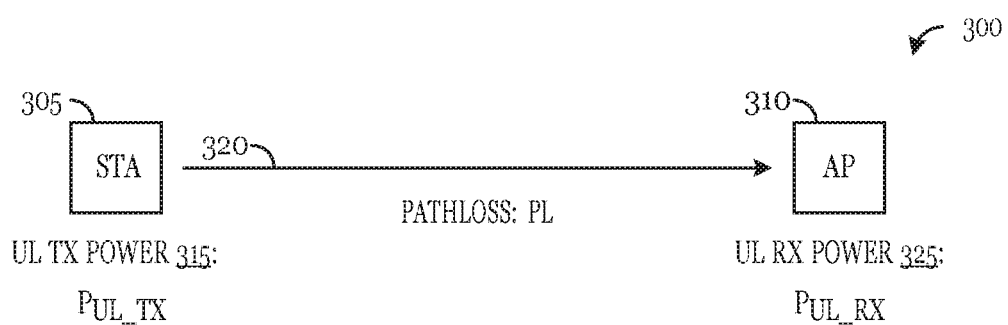
FIG. 3 illustrates an example communications system highlighting the relationship between transmit and receive power levels.

FIG. 3 illustrates an example communications system 300 highlighting the relationship between transmit and receive power levels. Communications system 300 includes a station 305 and an AP 310. An uplink channel 315 exists between station 305 and AP 310. Uplink channel 315 has a pathloss, denoted PL, that is dependent upon factors such as operating frequency, distance between station 305 and AP 310, any obstructions present between station 305 and AP 310, and so forth. As shown in FIG. 3, station 305 is making an uplink transmission to AP 310. Station 305 transmits the uplink transmission, where the uplink transmission is with an uplink transmit power 320, denoted $P_{UL\_TX}$. AP 310 receives the uplink transmission, where the uplink transmission is received with an uplink received power 325, denoted $P_{UL\_RX}$. The relationship between uplink transmit power 320, uplink received power 325, and pathloss may be expressed mathematically as:

$$P_{UL\_RX} = P_{UL\_TX} - PL.$$

Hence, it is possible for two uplink transmissions transmitted on two different channels with the same uplink transmit power to be received with different uplink received powers if the pathloss of the two channels are difference.

According to an example embodiment, the uplink transmit power level of a station making an uplink transmission simultaneously to multiple APs is determined in accordance with measurements associated with individual channels between the station and each one of the multiple APs, as well as a target uplink received power level of each one of the multiple APs. Examples of measurements associated with a channel include, but are not limited to: pathloss of the channel, received power level of a downlink transmission made on the channel, and so on.

In an embodiment, the station receives a trigger frame to initiate an uplink multi-AP transmission. The trigger frame includes information used by the station to make the uplink transmission. The information may include information of resources allocated for the uplink transmission, target uplink received powers for each of the APs participating in the uplink transmission, downlink transmit power levels for each of the APs participating in the uplink transmission, identifiers of the APs participating in the uplink transmission, and optionally, an indication of downlink frames transmitted by APs participating in the uplink transmission other than the AP that transmitted the trigger frame.

Figure 4:
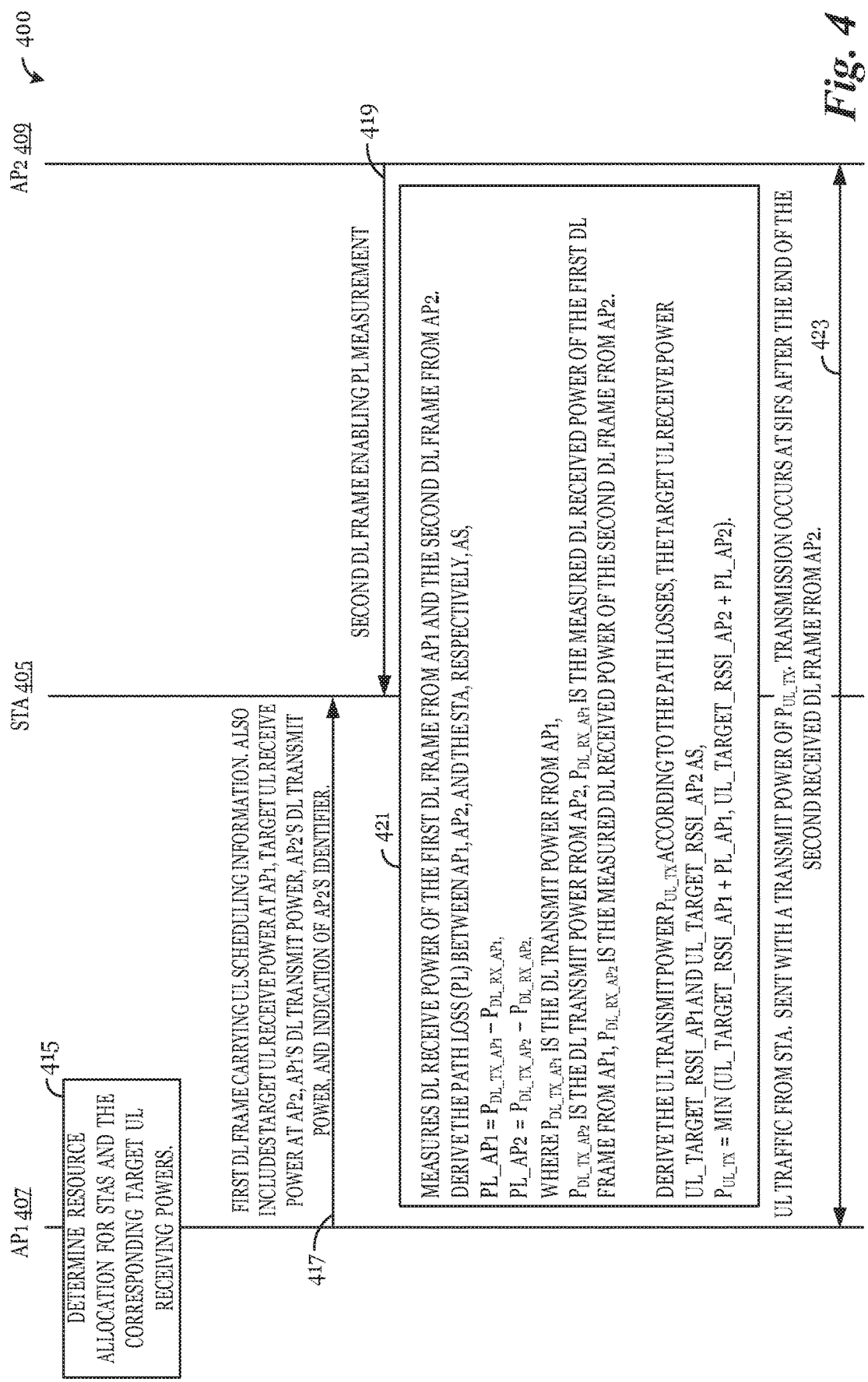
FIG. 4 illustrates a diagram of processing performed by and messages exchanged between devices participating in a first example uplink multi-AP transmission according to example embodiments presented herein.

For discussion purposes, consider a situation where two APs are participating in the uplink transmission made by a station. FIG. 4 illustrates a diagram 400 of processing performed by and messages exchanged between devices participating in a first example uplink multi-AP transmission. The devices participating in the first example uplink multi-AP transmission include a station 405, a first AP 407, and a second AP 409, where the first AP initiates the multi-AP coordination. Although the discussion focuses on a situation where two APs are coordinating, the example embodiments are operable with two or more APs. Therefore, the focus on two APs should not be construed as being limiting to either the scope or spirit of the example embodiments.

The first AP, operating as a master AP, for example, determines a resource allocation for the station, as well as corresponding target uplink received powers for the APs participating in the uplink multi-AP transmission (block 415). As an example, the first AP receives the target uplink received powers for the other APs participating in the uplink multi-AP transmission from a central controller or multiple central controllers. As another example, the first AP receives the target uplink received powers from the other APs participating in the uplink multi-AP transmission directly from the other APs. As yet another example, the first AP receives a first subset of the target uplink received powers from a subset of the other APs participating in the uplink multi-AP transmission, while the first AP receives a second subset of the target uplink received powers from a central controller or multiple central controllers.

The station receives a first downlink frame (i.e., the trigger frame) from the first AP (event 417). The first downlink frame includes uplink scheduling information indicating the resources allocated for the uplink transmission by the station. The first downlink frame also includes an indication of a target uplink receive power at the first AP (e.g., UL_Target_RSSI_AP1) for the station. RSSI is the received signal strength indicator. The first downlink frame also includes an indication of a target uplink receive power at a second AP (e.g., UL_Target_RSSI_AP2) for the station. The first AP may have received the UL_Target_RSSI_AP2 directly from the second AP or the first AP may have received it from a central controller.

The first downlink frame also includes an indication of the downlink transmit power level of the first AP (e.g., $P_{DL\_TX\_AP1}$) and an indication of the downlink transmit power level of the second AP (e.g., $P_{DL\_TX\_AP2}$). The first AP may have received the $P_{DL\_TX\_AP2}$ directly from the second AP or the first AP may have received it from a central controller. In an embodiment, the indication of the downlink transmit power level may be in the form of transmit power of the downlink frame. In an embodiment, the indication of the downlink transmit power level may be in the form of transmit power of the downlink frame normalized to a bandwidth, such as 20 MHz, but other values are possible. Other forms of indications are also possible.

The first downlink frame also includes an indication of the identifier of the second AP, such as the basic service set identifier (BSSID) or media access control (MAC) address of the second AP. The first downlink frame may include an indication of a downlink frame (a second downlink frame) from the second AP will follow the first downlink frame. In order to reduce overhead, the indication of the downlink frame from the second AP may be omitted. In such a situation, the presence or absence of the indication of the identifier of the second AP serves as an implicit indication of the second downlink frame. As an example, the presence of the indication of the identifier of the second AP implicitly indicates that the second downlink frame will follow the first downlink frame.

The second AP may listen to the first downlink frame to determine the uplink scheduling information indicating the resources allocated for the uplink transmission. Hence, the second AP knows when to attempt to receive the uplink transmission from the station. The first AP may share the uplink scheduling information indicating the resources allocated for the uplink transmission with the second AP. As an example, the first AP may send the uplink scheduling information indicating the resources allocated for the uplink transmission directly to the second AP. As another example, the first AP may send the uplink scheduling information indicating the resources allocated for the uplink transmission to the central controller and the central controller provides the uplink scheduling information indicating the resources allocated for the uplink transmission to the second AP.

In a situation where the uplink transmission from the station includes the addresses of the first AP and the second AP, the second AP may not need to know the uplink scheduling information. In this situation, the second AP may monitor the channel for uplink transmissions addressed to it. Similarly, in a situation where the uplink transmission from the station includes a group address that includes the first AP and the second AP, the second AP may monitor the channel for uplink transmissions addressed to it (the group address). In a situation where the uplink transmission from the station includes just the address of the first AP, the second AP and the first AP communicate (as discussed above) to allow the second AP to obtain the uplink scheduling information.

The station measures the downlink received power (e.g., a received signal strength indicator (RSSI)) of the first downlink frame from the first AP ($P_{DL\_RX\_AP1}$) and determines the pathloss (PL_AP1) between the station and the first AP as a difference between the downlink transmit power of the first AP and the downlink received power of the first AP (block 421). An example expression for determining the pathloss is follows:

$$PL\_AP1 = P_{DL\_TX\_AP1} - P_{DL\_RX\_AP1}.$$

The station receives the second downlink frame from the second AP (event 419). The station knows that the second downlink frame follows the first downlink frame by explicit indication (the indication of a downlink frame from the second AP) or implicit indication (the presence of the indication of the identifier of the second AP). The station measures the downlink received power of the second downlink frame from the second AP ($P_{DL\_RX\_AP2}$) and determines the pathloss (PL_AP2) between the station and the second AP as a difference between the downlink transmit power of the second AP and the downlink received power of the second AP (block 421). An example expression for determining the pathloss is follows:

$$PL\_AP2 = P_{DL\_TX\_AP2} - P_{DL\_RX\_AP2}.$$

After obtaining the pathloss for the channels with the first AP and the second AP, the station determines the uplink transmit power ($P_{UL\_TX}$) (block 421). The uplink transmit power is determined in accordance with the pathlosses, as well as the target uplink receive power UL_Target_RSSI_AP1 and UL_Target_RSSI_AP2, for example. The target uplink transmit power is expressible as a mathematical function of the pathlosses, as well as the target uplink receive power UL_Target_RSSI_AP1 and UL_Target_RSSI_AP2, for example, $$P_{UL\_TX} = \min(UL\_Target\_RSSI\_AP1 + PL\_AP1, UL\_Target\_RSSI\_AP2 + PL\_AP2),$$

where min( ) is the minimum function that returns the minimum value of the input provided to the function. Other mathematical functions may be used in place of or in combination with the minimum function. In this way, the uplink transmit power is determined by calculating a first required uplink transmit power such that the received power at the first AP satisfies the target uplink received power at the first AP (UL_Target_RSSI_AP1), calculating a second required uplink transmit power such that the received power at the second AP satisfies the target uplink received power at the second AP (UL_Target_RSSI_AP2), and then selecting the minimum of the two required uplink transmit power as the uplink transmit power to ensure that at least one of the received power at the first AP and the second AP is able to satisfy the corresponding target uplink received power. This helps the station to reduce its transmit power compared to a situation where the station is transmitting to only a single AP.

The uplink transmit power may be further limited by considering the station's maximum transmit power ($P_{UL\_TX\_MAX}$). As an example, the uplink transmit power may be further refined by applying the expression, for example, $$P_{UL\_TX\_REAL} = \min(P_{UL\_TX}, P_{UL\_TX\_MAX}).$$

Although the station is shown in FIG. 4 as measuring the downlink received power, determining the pathloss, and determining the uplink transmit power in a single block, the station may perform the operations in separate operations. Furthermore, the ordering of the operations may differ from the present discussion.

In a short interframe space (SIFS), for example, after the end of the second downlink frame from the second AP, the station starts its uplink transmission with the transmit power level of $P_{UL\_TX\_REAL}$ on the resource indicated by the uplink scheduling information indicating the resources allocated for the uplink transmission included in the first downlink frame (event 423).

Figures 5A, 5B, 5C:
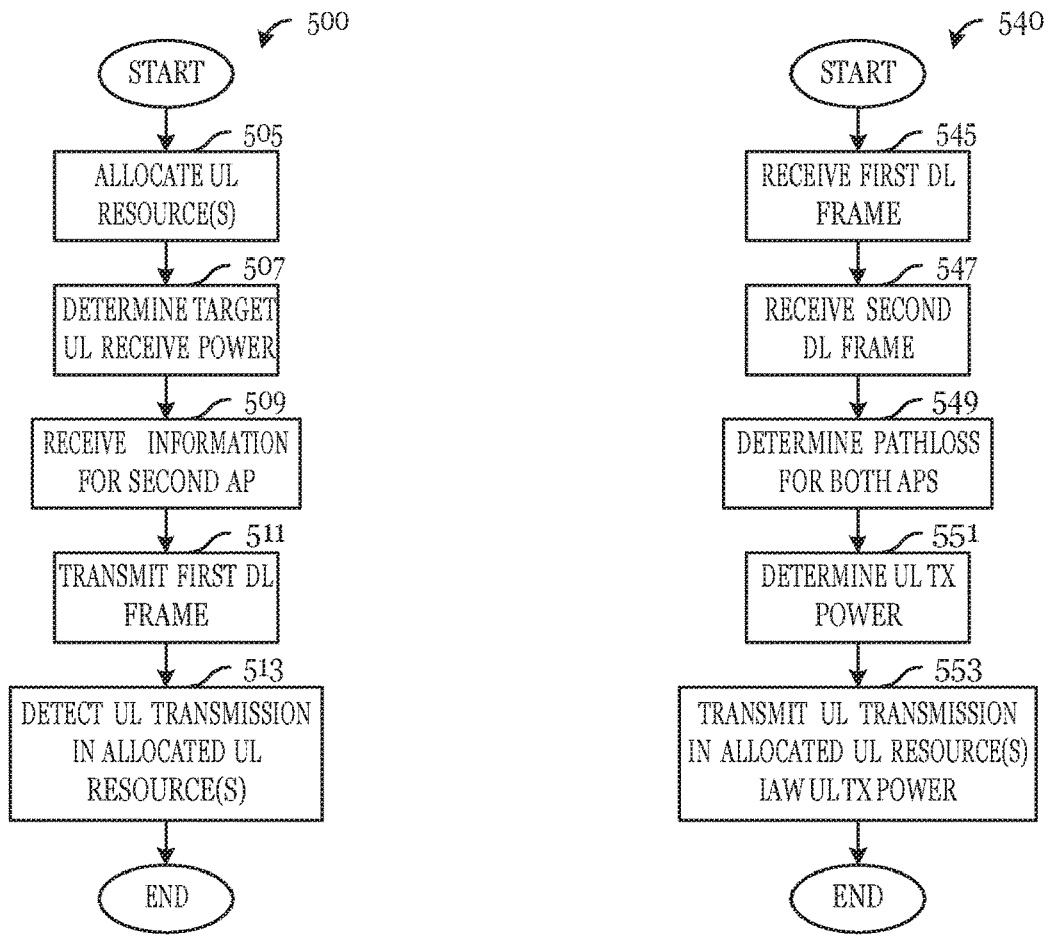
FIG. 5A illustrate flow diagrams of example operations occurring in a first AP as the first AP participates in the first example uplink multi-AP transmission according to example embodiments presented herein.
FIG. 5B illustrate flow diagrams of example operations occurring in a second AP as the second AP participates in the first example uplink multi-AP transmission according to example embodiments presented herein.
FIG. 5C illustrate flow diagrams of example operations occurring in a station as the station participates in the first example uplink multi-AP transmission according to example embodiments presented herein.

FIG. 5A illustrate flow diagrams of example operations 500 occurring in a first AP as the first AP participates in the first example uplink multi-AP transmission. Operations 500 may be indicative of operations occurring in a first AP as the first AP participates in the first example uplink multi-AP transmission.

Operations 500 begin with the first AP allocating uplink resource(s) for the uplink transmission (block 505). The first AP determines the target uplink receive power (block 507). The first AP determines the target uplink receive power based on the bandwidth of the uplink resources allocated for the uplink transmission, the modulation and coding scheme (MCS) configured for the uplink transmission, and the noise and interference level measured at the first AP, for example. The first AP determines the target uplink receive power based on the uplink receive power of other transmissions, for example. The first AP determines the target uplink receive power based on a technical standard, for example. The first AP determines the target uplink receive power based on settings specified by an operator of the communications system, for example. The first AP receives information from the second AP (block 509). The information may include a target uplink receive power of the second AP, as well as a downlink transmit power of the second AP. The information may be received from the second AP or from a central controller. The first AP generates and transmits a first downlink frame, i.e., a trigger frame (block 511). The first AP detects an uplink transmission (block 513). The first AP detects and receives the uplink transmission in the allocated uplink resource(s).

FIG. 5B illustrate flow diagrams of example operations 520 occurring in a second AP as the second AP participates in the first example uplink multi-AP transmission. Operations 520 may be indicative of operations occurring in a second AP as the second AP participates in the second example uplink multi-AP transmission.

Operations 520 begin with the second AP providing information to a first AP (block 525). The information may include a target uplink receive power of the second AP, as well as a downlink transmit power of the second AP. The second AP may provide the information to the first AP by transmitting the information to the first AP. The second AP may provide the information to the first AP by sending the information to a central controller, which will provide the information to the first AP as needed. The second AP sends the second downlink frame (block 527). The transmission of the second downlink frame allows the station to make measurements to determine the pathloss between the second AP and the station, and the uplink transmit power of the uplink transmission. The second AP detects an uplink transmission (block 529). The second AP detects and receives the uplink transmission in the allocated uplink resource(s).

The second AP may listen to the first downlink frame to determine the uplink scheduling information indicating the resources allocated for the uplink transmission. Hence, the second AP knows when to attempt to receive the uplink transmission from the station. The first AP may share the uplink scheduling information indicating the resources allocated for the uplink transmission with the second AP. As an example, the first AP may send the uplink scheduling information indicating the resources allocated for the uplink transmission directly to the second AP. As another example, the first AP may send the uplink scheduling information indicating the resources allocated for the uplink transmission to the central controller and the central controller provides the uplink scheduling information indicating the resources allocated for the uplink transmission to the second AP.

In a situation where the uplink transmission from the station includes the addresses of the first AP and the second AP, the second AP may not need to know the uplink scheduling information. In this situation, the second AP may monitor the channel for uplink transmissions addressed to it. Similarly, in a situation where the uplink transmission from the station includes a group address that includes the first AP and the second AP, the second AP may monitor the channel for uplink transmissions addressed to it (the group address). In a situation where the uplink transmission from the station includes just the address of the first AP, the second AP and the first AP communicate (as discussed above) to allow the second AP to obtain the uplink scheduling information.

FIG. 5C illustrate flow diagrams of example operations 540 occurring in a station as the station participates in the first example uplink multi-AP transmission. Operations 540 may be indicative of operations occurring in a station as the station participates in the second example multi-AP transmission.

Operations 540 begin with the station receiving the first downlink frame, i.e., the trigger frame (block 545). The station receives the first downlink frame from the first AP, for example. The station receives the second downlink frame (block 547). The station receives the second downlink frame from the second AP, for example. The station determines the pathloss for the first AP and the second AP (block 549). The pathloss for the first AP and the second AP are determined in accordance with the downlink frames from the respective APs. The station determines the uplink transmit powers (block 551). The station transmits the uplink packet in accordance with (JAW) the uplink transmit power (block 553).

In an embodiment, the station makes measurements of channels between itself and APs during normal operation, and uses these measurements to determine the uplink transmit power level instead of making extra measurements of the channels. In an embodiment discussed previously, the APs participating in the multi-AP coordination transmit downlink frames (e.g., the first and second downlink frames) to allow the station to make measurements of the channels between the APs and the station. In this embodiment, only the AP initiating the multi-AP coordination transmits a downlink frame (e.g., a trigger frame) to the station. The trigger frame includes information used by the station to make the uplink transmission. The information may include information of resources allocated for the uplink transmission, target uplink received powers for each of the APs participating in the uplink transmission, downlink transmit power level of the AP transmitting the trigger frame, and identifiers of the APs participating in the uplink transmission.

Because the other APs participating in the multi-AP coordination are not transmitting downlink frames, indications of the downlink frames transmitted by the other APs are not required and are not included in the trigger frame.

Instead of downlink frames being specifically transmitted by the other APs, the station utilizes downlink frames transmitted by the other APs prior to the transmission of the trigger frame to measure the channels between the station and each of the other APs. Because these downlink frames are transmitted by the other APs for other purposes, no additional overhead associated with multi-AP coordination is incurred.

The station may periodically, upon receipt of an instruction, or upon occurrence of an event, make measurements of channels between the station and each of the APs utilizing the downlink frames. The measurements of the channels may include a received signal strength, a RSSI, a pathloss, and so on. As an example, the station may be configured to make measurements of the channels at specified intervals. As another example, the station may be configured to make measurements of the channels when the station receives an instruction to make the measurements. As yet another example, the station may be configured to make measurements of the channels when a specified event occurs, where examples of specified events include, but are not limited to, a mobility event (a change in BSS, change of serving AP, change in position by a specified amount, change in operating frequency, and so on), an addition of a new AP, a removal of an existing AP, an addition of a new AP serving the station, the removal of an existing AP serving the station, and so forth.

The station saves the results of the measurements. When the station receives a trigger frame from an AP, the station uses the trigger frame to make measurements of the channel between the AP and the station. However, the station uses the saved measurement results for the other APs that are also participating in the multi-AP coordination.

Figure 6:
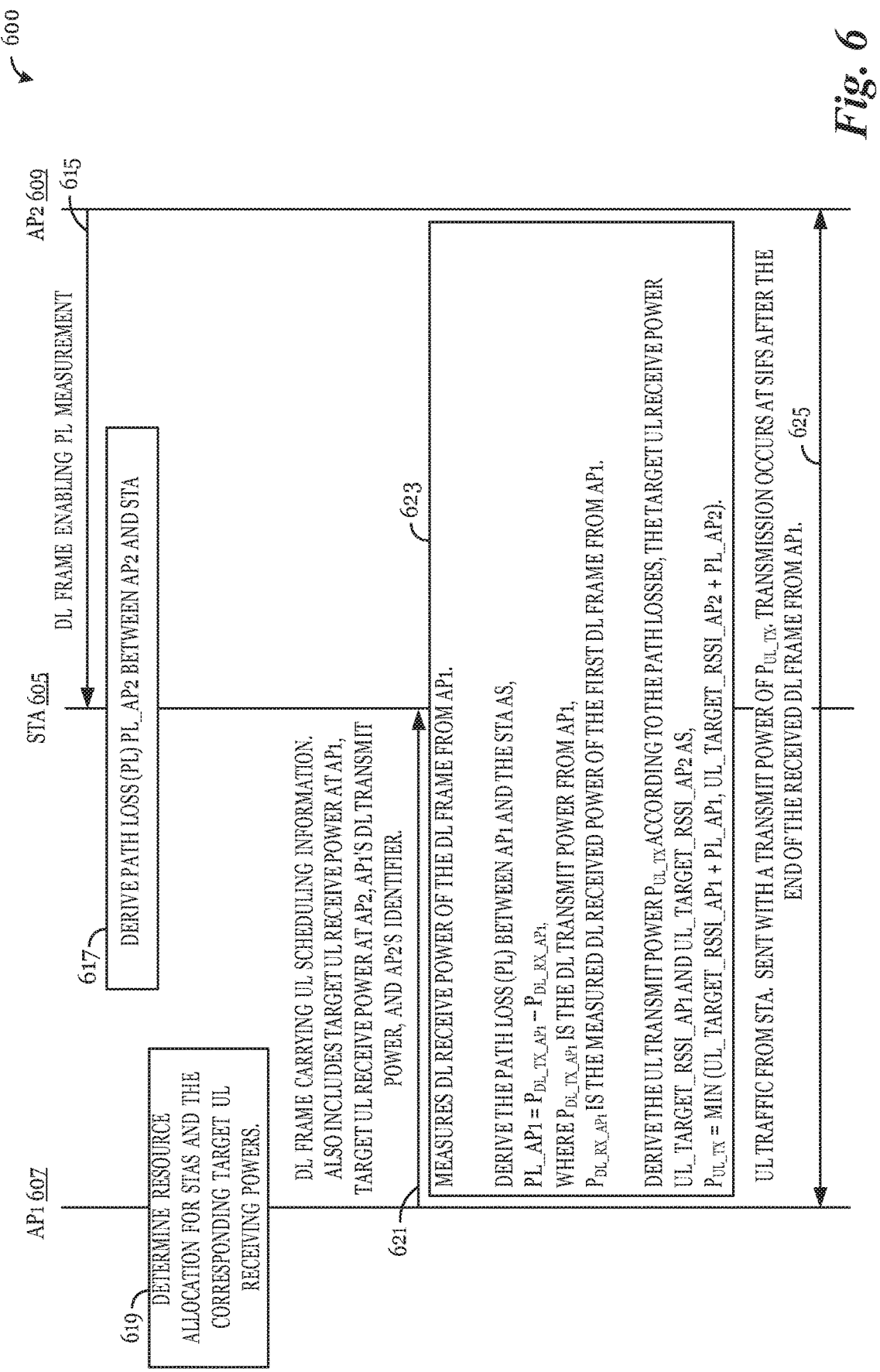
FIG. 6 illustrates a diagram of processing performed by and messages exchanged between devices participating in a second example uplink multi-AP transmission according to example embodiments presented herein.

For discussion purposes, consider a situation where two APs are participating in the uplink transmission made by a station. FIG. 6 illustrates a diagram 60o of processing performed by and messages exchanged between devices participating in a second example uplink multi-AP transmission. The devices participating in the first example uplink multi-AP transmission include a station 605, a first AP 607, and a second AP 609, where the first AP initiates the multi-AP coordination. Although the discussion focuses on a situation where two APs are coordinating, the example embodiments are operable with two or more APs. Therefore, the focus on two APs should not be construed as being limiting to either the scope or spirit of the example embodiments.

The station receives a first downlink frame from the second AP (event 615), where the first downlink frame is received by the station before the station receives a second downlink frame (i.e., the trigger frame from the first AP initiating the multi-AP coordination). The station measures the channel between the second AP and the station, and saves the results of the measurements (event 617). As an example, the station measures the downlink received power of the first downlink frame from the second AP and determines the pathloss between the station and the second AP. As an example, the first downlink frame may be a different trigger frame triggering a different multi-AP coordination instance. As another example, the first downlink frame may be a data or control frame transmitted by the second AP.

The first AP, operating as a master AP, for example, determines a resource allocation for the station, as well as corresponding target uplink received powers for the APs participating in the uplink multi-AP transmission (block 619). As an example, the first AP receives the target uplink received powers for the other APs participating in the uplink multi-AP transmission from a central controller or multiple central controllers. As another example, the first AP receives the target uplink received powers from the other APs participating in the uplink multi-AP transmission directly from the other APs. As yet another example, the first AP receives a first subset of the target uplink received powers from a subset of the other APs participating in the uplink multi-AP transmission, while the first AP receives a second subset of the target uplink received powers from a central controller or multiple central controllers.

The station receives a second downlink frame (i.e., the trigger frame) from the first AP (event 621). The first downlink frame includes uplink scheduling information indicating the resources allocated for the uplink transmission by the station. The first downlink frame also includes an indication of a target uplink receive power at the first AP (e.g., UL_Target_RSSI_AP1) for the station. The first downlink frame also includes an indication of a target uplink receive power at a second AP (e.g., UL_Target_RSSI_AP2) for the station. The first AP may have received the UL_Target_RSSI_AP2 directly from the second AP or the first AP may have received it from a central controller.

The first downlink frame also includes an indication of the downlink transmit power level of the first AP (e.g., $P_{DL\_TX\_AP1}$). In an embodiment, the indication of the downlink transmit power level may be in the form of transmit power of the downlink frame norm normalized to a bandwidth, such as 20 MHz, but other values are possible. Other forms of indications are also possible.

The first downlink frame also includes an indication of the identifier of the second AP, such as the BSSID or MAC address of the second AP. The second AP may listen to the first downlink frame to determine the uplink scheduling information indicating the resources allocated for the uplink transmission. Hence, the second AP knows when to attempt to receive the uplink transmission from the station. The first AP may share the uplink scheduling information indicating the resources allocated for the uplink transmission with the second AP. As an example, the first AP may send the uplink scheduling information indicating the resources allocated for the uplink transmission directly to the second AP. As another example, the first AP may send the uplink scheduling information indicating the resources allocated for the uplink transmission to the central controller and the central controller provides the uplink scheduling information indicating the resources allocated for the uplink transmission to the second AP.

In a situation where the uplink transmission from the station includes the addresses of the first AP and the second AP, the second AP may not need to know the uplink scheduling information. In this situation, the second AP may monitor the channel for uplink transmissions addressed to it. Similarly, in a situation where the uplink transmission from the station includes a group address that includes the first AP and the second AP, the second AP may monitor the channel for uplink transmissions addressed to it (the group address). In a situation where the uplink transmission from the station includes just the address of the first AP, the second AP and the first AP communicate (as discussed above) to allow the second AP to obtain the uplink scheduling information.

The station measures the downlink received power of the first downlink frame from the first AP ($P_{DL\_RX\_AP1}$) and determines the pathloss (PL_AP1) between the station and the first AP as a difference between the downlink transmit power of the first AP and the downlink received power of the first AP (block 623). An example expression for determining the pathloss is follows:

$$PL\_AP1 = P_{DL\_TX\_AP1} - P_{DL\_RX\_AP1}.$$

The station retrieves the pathloss (PL_AP2) for the second AP (block 623). The pathloss for the second AP may have been previously determined and saved by the station based on one or more downlink transmissions from the second AP. The station determines the uplink transmit power ($P_{UL\_TX}$) (block 623). The uplink transmit power is determined in accordance with the pathlosses, as well as the target uplink receive power UL_Target_RSSI_AP1 and UL_Target_RSSI_AP2, for example. The target uplink transmit power is expressible as a mathematical function of the pathlosses, as well as the target uplink receive power UL_Target_RSSI_AP1 and UL_Target_RSSI_AP2, for example, $$P_{UL\_TX} = \min(UL\_Target\_RSSI\_AP1 + PL\_AP1, UL\_Target\_RSSI\_AP2 + PL\_AP2),$$

where min( ) is the minimum function that returns the minimum value of the input provided to the function. Other mathematical functions may be used in place of or in combination with the minimum function. In this way, the uplink transmit power is determined by calculating a first required uplink transmit power such that the received power at the first AP satisfies the target uplink received power at the first AP (UL_Target_RSSI_AP1), calculating a second required uplink transmit power such that the received power at the second AP satisfies the target uplink received power at the second AP (UL_Target_RSSI_AP2), and then selecting the minimum of the two required uplink transmit power as the uplink transmit power to ensure that at least one of the received power at the first AP and the second AP is able to satisfy the corresponding target uplink received power. This helps the station to reduce its transmit power compared to a situation where the station is transmitting to only a single AP.

The uplink transmit power may be further limited by considering the station's maximum transmit power ($P_{UL\_TX\_MAX}$). As an example, the uplink transmit power may be further refined by applying the expression, for example, $$P_{UL\_TX\_REAL} = \min(P_{UL\_TX}, P_{UL\_TX\_MAX}).$$

In a SIFS, for example, after the end of the second downlink frame from the second AP, the station starts its uplink transmission with the transmit power level of $P_{UL\_TX\_REAL}$ on the resource indicated by the uplink scheduling information indicating the resources allocated for the uplink transmission included in the first downlink frame (event 625).

FIG. 7A illustrates flow diagrams of example operations 700 occurring in a first AP as the first AP participates in the second example uplink multi-AP transmission. Operations 700 may be indicative of operations occurring in a first AP as the first AP participates in the second example uplink multi-AP transmission.

Operations 700 begin with the first AP allocating uplink resource(s) for the uplink transmission (block 705). The first AP determines the target uplink receive power (block 707). The first AP determines the target uplink receive power based on the bandwidth of the uplink resources allocated for the uplink transmission, the MCS configured for the uplink transmission, and the noise and interference level measured at the first AP, for example. The first AP determines the target uplink receive power based on the uplink receive power of other transmissions, for example. The first AP determines the target uplink receive power based on a technical standard, for example. The first AP determines the target uplink receive power based on settings specified by an operator of the communications system, for example. The first AP receives information from the second AP (block 709). The information received from the second AP may include an identifier of the second AP. The first AP generates and transmits a first downlink frame, i.e., a trigger frame (block 711). The first AP detects an uplink transmission (block 713). The first AP detects and receives the uplink transmission in the allocated uplink resource(s).

FIG. 7B illustrates flow diagrams of example operations 720 occurring in a second AP as the second AP participates in the second example uplink multi-AP transmission. Operations 720 may be indicative of operations occurring in a second AP as the second AP participates in the second example uplink multi-AP transmission.

Operations 720 begin with the second AP transmitting a downlink frame (block 725). The downlink frame may be a trigger frame, a control frame, or a data frame. The downlink frame may be addressed to the station. Alternatively, the downlink frame may be addressed to a group of station that includes the station. Alternatively, the downlink frame may be broadcasted. Alternatively, the downlink frame may not be addressed to the station.

The second AP provides information to a first AP (block 727). The information may include a target uplink receive power of the second AP, as well as a downlink transmit power of the second AP. The second AP may provide the information to the first AP by transmitting the information to the first AP. The second AP may provide the information to the first AP by sending the information to a central controller, which will provide the information to the first AP as needed. The second AP detects an uplink transmission (block 729). The second AP detects and receives the uplink transmission in the allocated uplink resource(s).

The second AP may listen to the first downlink frame, i.e., the trigger frame, to determine the uplink scheduling information indicating the resources allocated for the uplink transmission. Hence, the second AP knows when to attempt to receive the uplink transmission from the station. The first AP may share the uplink scheduling information indicating the resources allocated for the uplink transmission with the second AP. As an example, the first AP may send the uplink scheduling information indicating the resources allocated for the uplink transmission directly to the second AP. As another example, the first AP may send the uplink scheduling information indicating the resources allocated for the uplink transmission to the central controller and the central controller provides the uplink scheduling information indicating the resources allocated for the uplink transmission to the second AP.

In a situation where the uplink transmission from the station includes the addresses of the first AP and the second AP, the second AP may not need to know the uplink scheduling information. In this situation, the second AP may monitor the channel for uplink transmissions addressed to it. Similarly, in a situation where the uplink transmission from the station includes a group address that includes the first AP and the second AP, the second AP may monitor the channel for uplink transmissions addressed to it (the group address). In a situation where the uplink transmission from the station includes just the address of the first AP, the second AP and the first AP communicate (as discussed above) to allow the second AP to obtain the uplink scheduling information.

FIG. 7C illustrates flow diagrams of example operations 740 occurring in a station as the station participates in the second example uplink multi-AP transmission. Operations 740 may be indicative of operations occurring in a station as the station participates in the second example uplink multi-AP transmission.

Operations 740 begin with the station receiving a first downlink frame (block 745). The first downlink frame may be received from the second AP. The first downlink frame may be a trigger frame, a control frame, or a data frame. The station determines the pathloss for the second AP (block 747). The pathloss for the second AP is determined in accordance with the first downlink frame from the second AP.

The station receives the second downlink frame, i.e., the trigger frame (block 749). The station receives the second downlink frame from the first AP, for example. The station determines the pathloss for the first AP (block 751). The pathloss for the first AP is determined in accordance with the second downlink frame from the first AP. The station determines the uplink transmit powers (block 753). The station determines the uplink transmit power based on the pathlosses of the channels between the station and the first AP and the second AP, for example. The station transmits the uplink packet in accordance with (JAW) the uplink transmit power (block 755).

In an embodiment, the uplink transmit power of the station ($P_{UL\_TX}$) is a determined as a mathematical function of the pathlosses and the target uplink received power at the APs participating in the multi-AP coordination. As an example, the uplink transmit power of the station is determined as a minimum of the sums of the pathlosses and the target uplink received power at the APs participating in the multi-AP coordination. As another example, the uplink transmit power of the station is determined as an average of the sums of the pathlosses and the target uplink received power at the APs participating in the multi-AP coordination. This may be expressed as:

$$P_{UL\_TX} = (P_{UL\_TX\_AP1} + P_{UL\_TX\_AP2})/2,$$

where $P_{UL\_TX\_AP1}$ and $P_{UL\_TX\_AP2}$ are the sums of the pathloss and the target uplink received power at the respective APs participating in the multi-AP coordination. As another example, the uplink transmit power of the station is determined as a weighted average of the sums of the pathlosses and the target uplink received power at the APs participating in the multi-AP coordination. This may be expressed as:

$$P_{UL\_TX} = (Wt_{AP1} * P_{UL\_TX\_AP1} + Wt_{AP2} * P_{UL\_TX\_AP2})/2,$$

where $Wt_{AP1}$ and $Wt_{AP2}$ are the weights for the respective APs participating in the multi-AP coordination. The weights for the respective APs may be set based on priority, traffic load, performance history, congestion, and so forth. As yet another example, the uplink transmit power of the station is determined as a maximum of the sums of the pathlosses and the target uplink received power at the APs participating in the multi-AP coordination. This may be expressed as:

$$P_{UL\_TX} = \max(P_{UL\_TX\_AP1}, P_{UL\_TX\_AP2}),$$

where max( ) is the maximum function that returns the maximum value of the input provided to the function. As yet another example, the uplink transmit power of the station is determined as a maximum of the sums of the pathlosses and the target uplink received power at the APs participating in the multi-AP coordination, and a correction factor. This may be expressed as:

$$P_{UL\_TX} = \max(P_{UL\_TX\_AP1}, P_{UL\_TX\_AP2}) - \text{Correction\_factor},$$

where Correction_factor is a numerical value, in dB for example. The Correction_factor may be equal to 3 dB, for example, to compensate for the combination gain of the uplink signals at the APs, when there are two APs participating in the multi-AP coordination. The Correction_factor can differ for different numbers of APs participating in the multi-AP coordination.

Although the examples presented herein for the situation where the uplink transmit power of the station is a determined as a mathematical function of the pathlosses and the target uplink received power at the APs participating in the multi-AP coordination are for the two participating AP case, the example embodiments presented herein are operable for any number of participating APs greater than two. Therefore, the scope and spirit of the example embodiments should not be construed as being limited by the examples presented herein.

Figure 8:
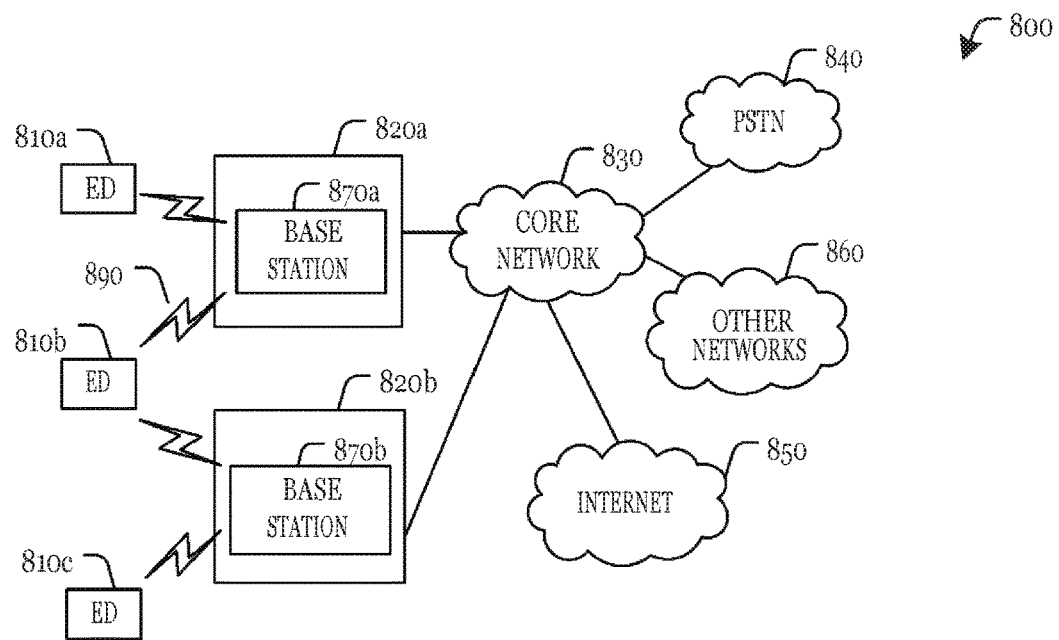
FIG. 8 illustrates an example communication system according to example embodiments presented herein.

FIG. 8 illustrates an example communication system 800. In general, the system 800 enables multiple wireless or wired users to transmit and receive data and other content.

The system 800 may implement one or more channel access methods, such as code division multiple access (CDMA), time division multiple access (TDMA), frequency division multiple access (FDMA), orthogonal FDMA, single-carrier FDMA (SC-FDMA), or non-orthogonal multiple access (NOMA).

In this example, the communication system 800 includes electronic devices (ED) 810*a*-810*c*, radio access networks (RANs) 820*a*-820*b*, a core network 830, a public switched telephone network (PSTN) 840, the Internet 850, and other networks 860. While certain numbers of these components or elements are shown in FIG. 8, any number of these components or elements may be included in the system 800.

The EDs 810*a*-810*c* are configured to operate or communicate in the system 800. For example, the EDs 810*a*-810*c* are configured to transmit or receive via wireless or wired communication channels. Each ED 810*a*-810*c* represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 820*a*-820*b* here include base stations 870*a*-870*b*, respectively. Each base station 870*a*-870*b* is configured to wirelessly interface with one or more of the EDs 810*a*-810*c* to enable access to the core network 830, the PSTN 840, the Internet 850, or the other networks 860. For example, the base stations 870*a*-870*b* may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 810*a*-810*c* are configured to interface and communicate with the Internet 850 and may access the core network 830, the PSTN 840, or the other networks 860.

In the embodiment shown in FIG. 8, the base station 870*a* forms part of the RAN 820*a*, which may include other base stations, elements, or devices. Also, the base station 870*b* forms part of the RAN 820*b*, which may include other base stations, elements, or devices. Each base station 870*a*-870*b* operates to transmit or receive wireless signals within a particular geographic region or area, sometimes referred to as a "cell." In some embodiments, multiple-input multiple-output (MIMO) technology may be employed having multiple transceivers for each cell.

The base stations 870*a*-870*b* communicate with one or more of the EDs 810*a*-810*c* over one or more air interfaces 890 using wireless communication links. The air interfaces 890 may utilize any suitable radio access technology.

It is contemplated that the system 800 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 820*a*-820*b* are in communication with the core network 830 to provide the EDs 810*a*-810*c* with voice, data, application, Voice over Internet Protocol (VoIP), or other services. Understandably, the RANs 820*a*-820*b* or the core network 830 may be in direct or indirect communication with one or more other RANs (not shown). The core network 830 may also serve as a gateway access for other networks (such as the PSTN 840, the Internet 850, and the other networks 860). In addition, some or all of the EDs 810*a*-810*c* may include functionality for communicating with different wireless networks over different wireless links using different wireless technologies or protocols. Instead of wireless communication (or in addition thereto), the EDs may communicate via wired communication channels to a service provider or switch (not shown), and to the Internet 850.

Although FIG. 8 illustrates one example of a communication system, various changes may be made to FIG. 8. For example, the communication system 800 could include any number of EDs, base stations, networks, or other components in any suitable configuration.

Figure 9A:
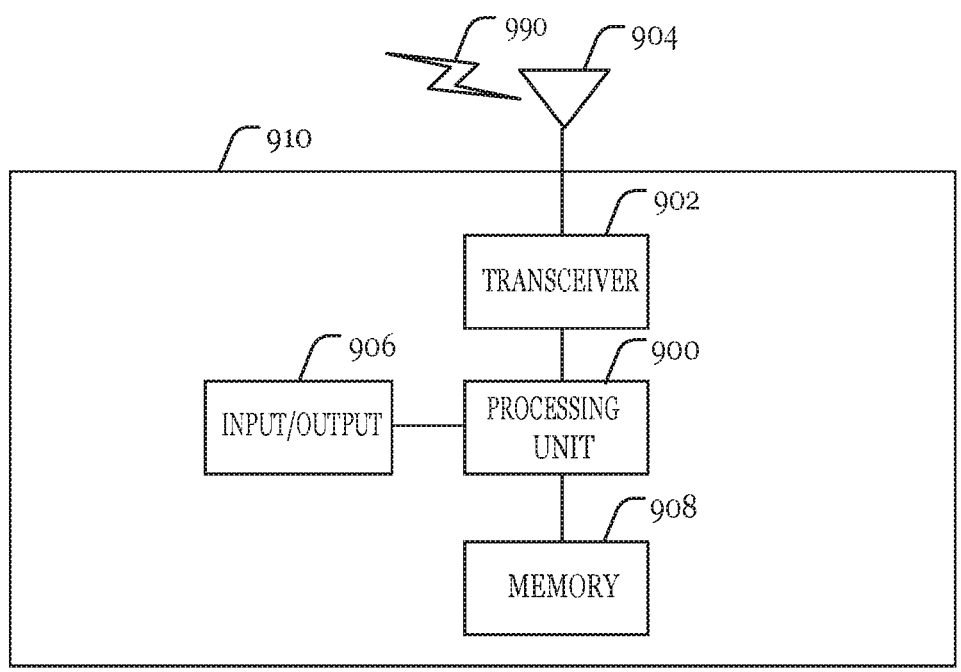
FIGS. 9A and 9B illustrate example devices that may implement the methods and teachings according to this disclosure.
Figure 9B:
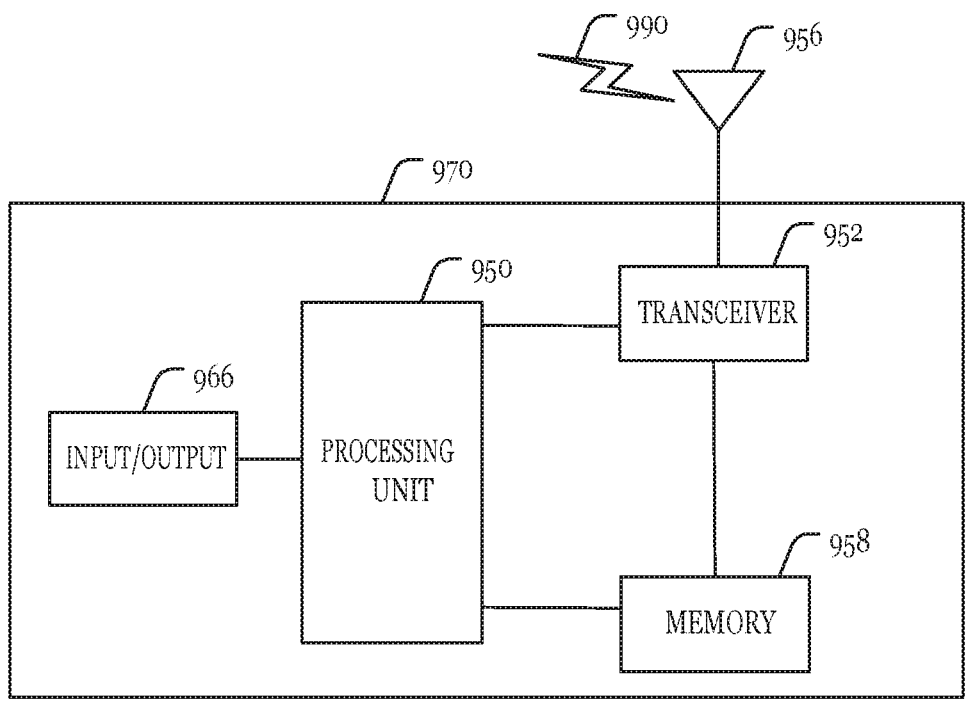

FIGS. 9A and 9B illustrate example devices that may implement the methods and teachings according to this disclosure. In particular, FIG. 9A illustrates an example ED 910, and FIG. 9B illustrates an example base station 970. These components could be used in the system 800 or in any other suitable system.

As shown in FIG. 9A, the ED 910 includes at least one processing unit 900. The processing unit 900 implements various processing operations of the ED 910. For example, the processing unit 900 could perform signal coding, data processing, power control, input/output processing, or any other functionality enabling the ED 910 to operate in the system 800. The processing unit 900 also supports the methods and teachings described in more detail above. Each processing unit 900 includes any suitable processing or computing device configured to perform one or more operations. Each processing unit 900 could, for example, include a microprocessor, microcontroller, digital signal processor, field programmable gate array, or application specific integrated circuit.

The ED 910 also includes at least one transceiver 902. The transceiver 902 is configured to modulate data or other content for transmission by at least one antenna or NIC (Network Interface Controller) 904. The transceiver 902 is also configured to demodulate data or other content received by the at least one antenna 904. Each transceiver 902 includes any suitable structure for generating signals for wireless or wired transmission or processing signals received wirelessly or by wire. Each antenna 904 includes any suitable structure for transmitting or receiving wireless or wired signals. One or multiple transceivers 902 could be used in the ED 910, and one or multiple antennas 904 could be used in the ED 910. Although shown as a single functional unit, a transceiver 902 could also be implemented using at least one transmitter and at least one separate receiver.

The ED 910 further includes one or more input/output devices 906 or interfaces (such as a wired interface to the Internet 850). The input/output devices 906 facilitate interaction with a user or other devices (network communications) in the network. Each input/output device 906 includes any suitable structure for providing information to or receiving information from a user, such as a speaker, microphone, keypad, keyboard, display, or touch screen, including network interface communications.

In addition, the ED 910 includes at least one memory 908. The memory 908 stores instructions and data used, generated, or collected by the ED 910. For example, the memory 908 could store software or firmware instructions executed by the processing unit(s) 900 and data used to reduce or eliminate interference in incoming signals. Each memory 908 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 9B, the base station 970 includes at least one processing unit 950, at least one transceiver 952, which includes functionality for a transmitter and a receiver, one or more antennas 956, at least one memory 958, and one or more input/output devices or interfaces 966. A scheduler, which would be understood by one skilled in the art, is coupled to the processing unit 950. The scheduler could be included within or operated separately from the base station 970. The processing unit 950 implements various processing operations of the base station 970, such as signal coding, data processing, power control, input/output processing, or any other functionality. The processing unit 950 can also support the methods and teachings described in more detail above. Each processing unit 950 includes any suitable processing or computing device configured to perform one or more operations. Each processing unit 950 could, for example, include a microprocessor, microcontroller, digital signal processor, field programmable gate array, or application specific integrated circuit.

Each transceiver 952 includes any suitable structure for generating signals for wireless or wired transmission to one or more EDs or other devices. Each transceiver 952 further includes any suitable structure for processing signals received wirelessly or by wire from one or more EDs or other devices. Although shown combined as a transceiver 952, a transmitter and a receiver could be separate components. Each antenna 956 includes any suitable structure for transmitting or receiving wireless or wired signals. While a common antenna 956 is shown here as being coupled to the transceiver 952, one or more antennas 956 could be coupled to the transceiver(s) 952, allowing separate antennas 956 to be coupled to the transmitter and the receiver if equipped as separate components. Each memory 958 includes any suitable volatile or non-volatile storage and retrieval device(s). Each input/output device 966 facilitates interaction with a user or other devices (network communications) in the network. Each input/output device 966 includes any suitable structure for providing information to or receiving/providing information from a user, including network interface communications.

Figure 10:
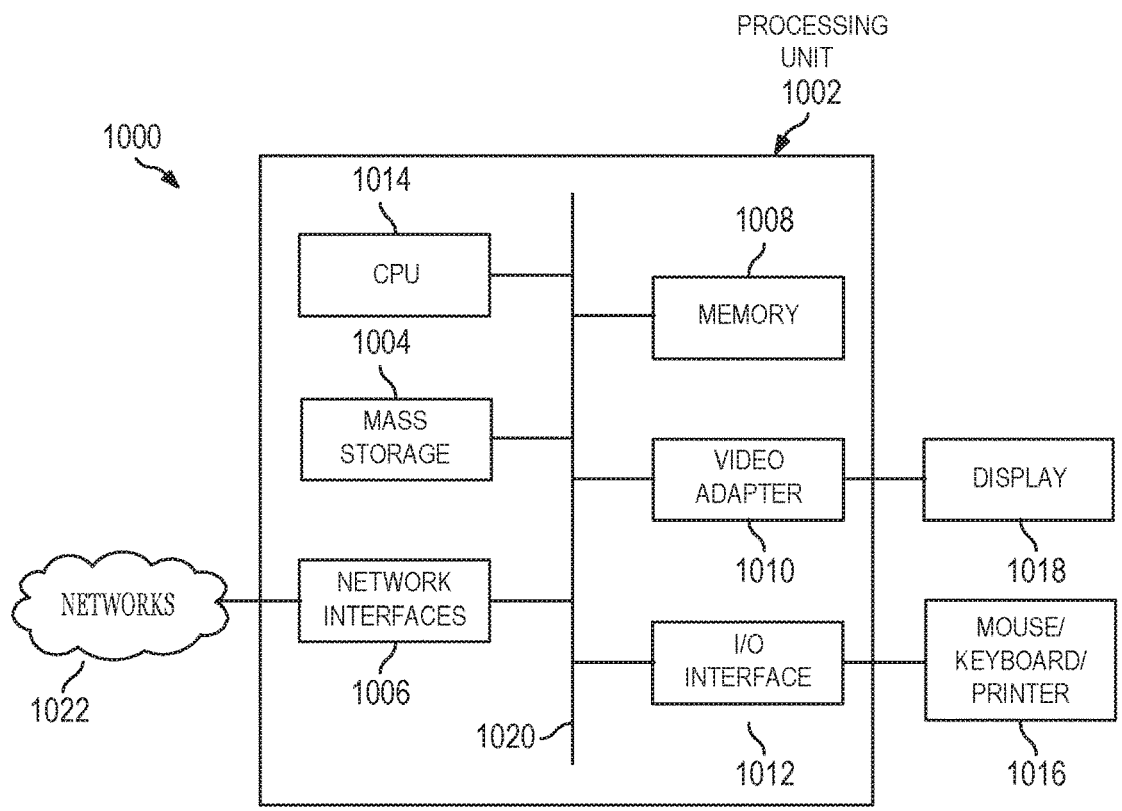
FIG. 10 is a block diagram of a computing system that may be used for implementing the devices and methods disclosed herein.

FIG. 10 is a block diagram of a computing system 1000 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1000 includes a processing unit 1002. The processing unit includes a central processing unit (CPU) 1014, memory 1008, and may further include a mass storage device 1004, a video adapter 1010, and an I/O interface 1012 connected to a bus 1020.

The bus 1020 may be one or more of any type of several bus architectures including a memory bus or memory controller, a peripheral bus, or a video bus. The CPU 1014 may comprise any type of electronic data processor. The memory 1008 may comprise any type of non-transitory system memory such as static random access memory (SRAM), dynamic random access memory (DRAM), synchronous DRAM (SDRAM), read-only memory (ROM), or a combination thereof. In an embodiment, the memory 1008 may include ROM for use at boot-up, and DRAM for program and data storage for use while executing programs.

The mass storage 1004 may comprise any type of non-transitory storage device configured to store data, programs, and other information and to make the data, programs, and other information accessible via the bus 1020. The mass storage 1004 may comprise, for example, one or more of a solid state drive, hard disk drive, a magnetic disk drive, or an optical disk drive.

The video adapter 1010 and the I/O interface 1012 provide interfaces to couple external input and output devices to the processing unit 1002. As illustrated, examples of input and output devices include a display 1018 coupled to the video adapter 1010 and a mouse, keyboard, or printer 1016 coupled to the I/O interface 1012. Other devices may be coupled to the processing unit 1002, and additional or fewer interface cards may be utilized. For example, a serial interface such as Universal Serial Bus (USB) (not shown) may be used to provide an interface for an external device.

The processing unit 1002 also includes one or more network interfaces 1006, which may comprise wired links, such as an Ethernet cable, or wireless links to access nodes or different networks. The network interfaces 1006 allow the processing unit 1002 to communicate with remote units via the networks. For example, the network interfaces 1006 may provide wireless communication via one or more transmitters/transmit antennas and one or more receivers/receive antennas. In an embodiment, the processing unit 1002 is coupled to a local-area network 1022 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit or module, or a measuring unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed:

1. A computer-implemented method comprising:
receiving, by a station, a first frame in a multi-Access point (multi-AP) communication, the first frame indicating a resource for the station to transmit a packet, a first target received power level at a first AP, a second target received power level at a second AP, and a first transmit power level of the first AP;
determining, by the station, a second transmit power level of the station for transmission in accordance with the first target received power level at the first AP, the second target received power level at the second AP, and the first transmit power level of the first AP; and
transmitting, by the station, the packet in the resource indicated by the first frame in accordance with the second transmit power level determined.

2. The computer-implemented method of claim 1, wherein the first frame further indicates an identifier of the second AP.

3. The computer-implemented method of claim 1, wherein the first frame further indicates that a second frame is to be transmitted by the second AP to the station following the first frame in a time domain.

4. The computer-implemented method of claim 1, wherein the first frame further indicates a third transmit power level of the second AP.

5. The computer-implemented method of claim 1, wherein determining the second transmit power level of the station comprises:
   measuring, by the station, a first received power level of the first frame at the station, the first frame sent by the first AP to the station;
   determining, by the station, a first pathloss between the first AP and the station in accordance with the first received power level at the station and the first transmit power level of the first AP;
   measuring, by the station, a second received power level of a second frame at the station, the second frame sent by the second AP to the station;
   determining, by the station, a second pathloss between the second AP and the station in accordance with the second received power level at the station and a third transmit power level of the second AP; and
   determining, by the station, the second transmit power level of the station in accordance with the first pathloss, the second pathloss, the first target received power level at the first AP, and the second target received power level at the second AP.

6. The computer-implemented method of claim 5, wherein the second transmit power level of the station is determined by applying a mathematical function to the first target received power level at the first AP, the second target received power level at the second AP, the first pathloss, and the second pathloss.

7. The computer-implemented method of claim 6, wherein the mathematical function is expressible as $$P_{UL\_TX}=\min(UL\_Target\_RSSI\_AP1+PL\_AP1, UL\_Target\_RSSI\_AP2+PL\_AP2),$$

wherein $P_{UL\_TX}$ is the second transmit power level, UL_Target_RSSI_AP1 is the first target received power level, UL_Target_RSSI_AP2 is the second target received power level, PL_AP1 is the first pathloss, PL_AP2 is the second pathloss, and min( ) is a minimum function that returns a minimum value of its input elements.

8. The computer-implemented method of claim 6, wherein the mathematical function is expressible as $$P_{UL\_TX}=(UL\_Target\_RSSI\_AP1+PL\_AP1+UL\_Target\_RSSI\_AP2+PL\_AP2)/2,$$

wherein $P_{UL\_TX}$ is the second transmit power level, UL_Target_RSSI_AP1 is the first target received power level, UL_Target_RSSI_AP2 is the second target received power level, PL_AP1 is the first pathloss, and PL_AP2 is the second pathloss.

9. The computer-implemented method of claim 6, wherein the mathematical function is expressible as $$P_{UL\_TX}=\max(UL\_Target\_RSSI\_AP1+PL\_AP1, UL\_Target\_RSSI\_AP2+PL\_AP2)-\text{Correction\_factor},$$

wherein $P_{UL\_TX}$ is the second transmit power level, UL_Target_RSSI_AP1 is the first target received power level, UL_Target_RSSI_AP2 is the second target received power level, PL_AP1 is the first pathloss, PL_AP2 is the second pathloss, Correction_factor is a correction value to compensate for a combining gain of the packet at APs receiving the packet, and max( ) is a maximum function that returns a maximum value of its input elements.

10. A computer-implemented method comprising:
    transmitting, by a first access point (AP) to a station in a multi-AP communication, a first frame, the first frame indicating a resource for the station to transmit a packet, a first target received power level at the first AP, a second target received power level at a second AP in the multi-AP communication, and a first transmit power level of the first AP; and
    receiving, by the first AP, the packet in the resource, wherein the packet is received at a receive power level determined in accordance with the first target received power level at the first AP, the second target received power level at the second AP, and the first transmit power level of the first AP.

11. The computer-implemented method of claim 10, wherein the first frame further indicates an identifier of the second AP.

12. The computer-implemented method of claim 10, wherein the first frame further indicates that a second frame is to be transmitted by the second AP to the station following the first frame in a time domain.

13. The computer-implemented method of claim 10, wherein the first frame further indicates a second transmit power level of the second AP.

14. A station comprising:
    a non-transitory memory storage comprising instructions; and
    one or more processors in communication with the memory storage, wherein the instructions, when executed by the one or more processors, cause the station to:
      receive a first frame in a multi-Access point (multi-AP) communication, the first frame indicating a resource for the station to transmit a packet, a first target received power level at a first AP, a second target received power level at a second AP, and a first transmit power level of the first AP,
      determine a second transmit power level of the station for transmission in accordance with the first target received power level at the first AP, the second target received power level at the second AP, and the first transmit power level of the first AP, and
      transmit the packet in the resource indicated by the first frame in accordance with the second transmit power level determined.

15. The station of claim 14, wherein the first frame further indicates an identifier of the second AP.

16. The station of claim 14, wherein the first frame further indicates a third transmit power level of the second AP.

17. The station of claim 14, wherein the instructions, when executed by the one or more processors, further cause the station to:
    measure a first received power level of the first frame at the station, the first frame sent by the first AP to the station,
    determine a first pathloss between the first AP and the station in accordance with the first received power level at the station and the first transmit power level of the first AP,
    measure a second received power level of a second frame at the station, the second frame sent by the second AP to the station, determine a second pathloss between the second AP and the station in accordance with the second received power level at the station and a third transmit power level of the second AP, and determine the second transmit power level of the station in accordance with the first pathloss, the second pathloss, the first target received power level at the first AP, and the second target received power level at the second AP.

18. A first access point (AP) comprising:

a non-transitory memory storage comprising instructions; and one or more processors in communication with the memory storage, wherein the instructions, when executed by the one or more processors, cause the first AP to:

transmit a first frame to a station in a multi-AP communication, the first frame indicating a resource for the station to transmit a packet, a first target received power level at the first AP, a second target received power level at a second AP in the multi-AP communication, and a first transmit power level of the first AP, and receive the packet in the resource, wherein the packet is received at a received power level determined in accordance with the first target received power level at the first AP, the second target received power level at the second AP, and the first transmit power level of the first AP.

19. The first AP of claim 18, wherein the first frame further indicates an identifier of the second AP.

20. The first AP of claim 18, wherein the first frame further indicates a second transmit power level of the second AP.

\* \* \* \* \*